(12) United States Patent
Paul et al.

(10) Patent No.: US 11,946,421 B2
(45) Date of Patent: Apr. 2, 2024

(54) USE OF PARTICULATE SENSOR IN ENGINE POWER ASSURANCE

(71) Applicant: General Electric Company, Schenectady, NY (US)

(72) Inventors: Jacques Paul, Lynn, MA (US); Charles W. Dowdell, Lynn, MA (US); James R. Noel, Lynn, MA (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 17/669,335

(22) Filed: Feb. 10, 2022

(65) Prior Publication Data

US 2023/0250762 A1  Aug. 10, 2023

(51) Int. Cl.
*F02C 9/00* (2006.01)
*F02C 7/04* (2006.01)

(52) U.S. Cl.
CPC .............. *F02C 9/00* (2013.01); *F02C 7/04* (2013.01); *F05D 2260/80* (2013.01)

(58) Field of Classification Search
CPC ........... F02C 9/00; F02C 7/04; F05D 2260/80
USPC ..................................... 701/99, 100
See application file for complete search history.

(56) References Cited

U.S. PATENT DOCUMENTS

| | | |
|---|---|---|
| 6,841,299 B2 | 1/2005 | Wariishi |
| 6,941,806 B2 | 9/2005 | Burns |
| 6,960,719 B2 | 11/2005 | Miksch |
| 6,986,162 B2 | 1/2006 | Soto |
| 8,424,279 B2 | 4/2013 | Rajamani |
| 8,914,149 B2 | 12/2014 | Safa-Bakhsh |
| 9,714,967 B1 | 7/2017 | Weickert |
| 9,728,093 B2 | 8/2017 | Wiesemann |
| 9,909,971 B2 | 3/2018 | Knobloch |
| 10,024,187 B2 | 7/2018 | Soares, Jr. |
| 10,073,008 B2 | 9/2018 | Weickert |
| 10,672,282 B2 | 6/2020 | Garde |
| 10,725,382 B2 | 7/2020 | Zustiak |
| 10,752,382 B2 | 8/2020 | Kessie |
| 10,767,507 B2 | 9/2020 | Khibnik |
| 10,867,521 B2 | 12/2020 | Grimald |
| 10,977,880 B2 | 4/2021 | Calkins |
| 2007/0118270 A1 | 5/2007 | Wiseman |
| 2010/0287907 A1 | 11/2010 | Agrawal |
| 2018/0068498 A1 | 3/2018 | Hodge |

(Continued)

FOREIGN PATENT DOCUMENTS

| | | |
|---|---|---|
| GB | 2529271 A | 2/2016 |
| WO | 2011151462 | 12/2011 |

OTHER PUBLICATIONS

US 10,689,127 B2, 06/2020, Abe (withdrawn)

*Primary Examiner* — Steven M Sutherland
(74) *Attorney, Agent, or Firm* — Fitch, Even, Tabin & Flannery LLP

(57) ABSTRACT

A system includes one or more debris sensors or particulate sensors are used to sense engine inlet debris or particulate matter which are drawn into the engine during flight, in real-time. The system employs that information, in conjunction with other engine health and module health techniques, to identify which gas-path modules of the aircraft engine may require maintenance or repair. In one embodiment, existing engine health technique may be based on various engine operational parameters for a new engine or an average engine.

20 Claims, 6 Drawing Sheets

Exemplary Method

(56) References Cited

U.S. PATENT DOCUMENTS

| | | |
|---|---|---|
| 2018/0081364 A1 | 3/2018 | Northcutt |
| 2018/0099760 A1* | 4/2018 | Paul .................. G05B 17/02 |
| 2019/0093568 A1 | 3/2019 | Escriche |
| 2019/0112072 A1 | 4/2019 | Abe |
| 2019/0146000 A1 | 5/2019 | Hurst |
| 2023/0251651 A1 | 8/2023 | Noel |

* cited by examiner

USE OF PARTICULATE SENSOR IN ENGINE POWER ASSURANCE

TECHNICAL FIELD

The embodiments relate to the fields of aviation and engine performance assessment.

BACKGROUND

An aircraft turbine engine generally includes a core having, in serial flow order, a compressor section, a combustion section, a turbine section, and an exhaust section. One or more shafts may be provided to drivingly connect the turbine section to the compressor section, and optionally, to drivingly connect the turbine section to a load. When such an aircraft engine is incorporated into a rotary aircraft, such as a helicopter, the one or more shafts of the aircraft engine may be mechanically coupled to a main rotor such that the main rotor may provide lift for the rotary aircraft.

One factor that may significantly impact the performance of aircraft engines is the intake of particulate matter (PAM), such as dust, debris, etc. At higher altitudes, the intake of PAM may be minimal. However, for engines operating for sustained periods of time at low altitudes, an accumulation of PAM from the air can substantially reduce engine power. This accumulation may in turn imperil aircraft operability and prevent or limit mission completion.

BRIEF DESCRIPTION OF THE DRAWINGS

Advantageous designs of the embodiments result from independent and dependent claims, the description, and the drawings. In the following, various examples of embodiments are explained in detail with the aid of the attached drawings:

DETAILED DESCRIPTION

Figure 1:
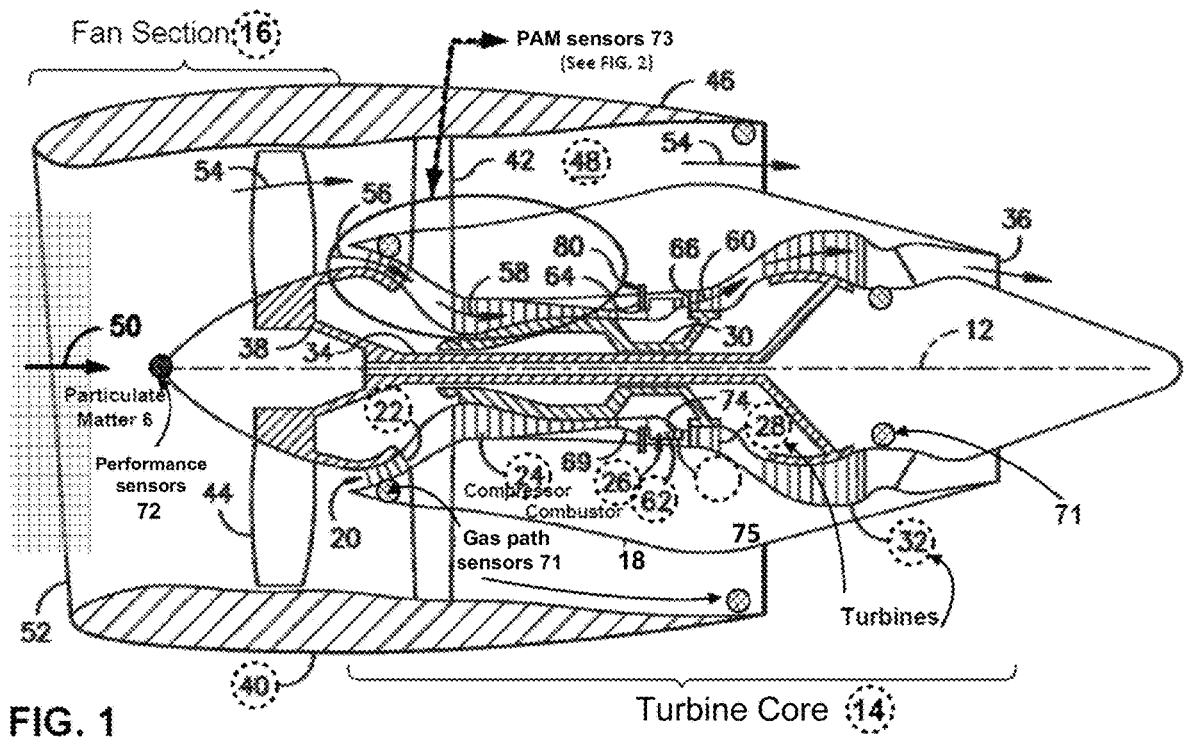
FIG. 1 illustrates an exemplary aircraft engine according to the embodiments.

The following detailed description is merely exemplary in nature and is not intended to limit the disclosure, nor the elements or disclosure, nor its applications. Further, there is no intention for the scope to be bound or limited to or by any theory presented in the preceding background or summary, nor in the following detailed description.

As used herein, the term PAM generally refers to small particles of matter that are substantially suspended in the air, or briefly present in the air due to sudden air motions, and may be taken into the engine. For example, PAM can include dust, debris, sand, aerosol particles etc., and may include sizes from 0.1 micrometers (μms) to 2 millimeters (mms).

PAM is generally sufficiently large to jeopardize engine operation over time, but small enough to avoid immediately impacting engine operations or damage engine components. Larger particles of matter, however, such as granules, gravel, etc. present a greater risk of immediate damage to engine operations. These larger particles of matter can have an especially strong negative affect, for example, on compressor performance—rendering the compressors unable to compress air (i.e., reducing compressor flow scalar).

Smaller particles may have a stronger impact on high-pressure turbines because the smaller particles may melt and bond with the high-pressure turbine. High-pressure turbines may employ air cooling to keep the blade from melting, but air flow cooling passages can get plugged by particular matter. This reduces turbine cooling air scalar, or secondary flow quantity. Particles of various sizes may also result in generally higher engine temperatures downstream, reducing an engine's efficiency scalar.

Degradation is also a significant consideration. For example, it is prudent to ensure aircraft engines are operating properly before and/or during flight, and to maintain such aircraft engines before the engine degrades past a threshold. One measure of degradation is engine torque factor (ETF): a non-dimensional ratio of a current maximum corrected torque compared to a maximum corrected torque available to a nominal engine.

When the ETF degrades below a threshold, the engine may be sidelined for maintenance. Engine degradation can be caused by an intake of dust, or other PAM, and could be sufficient to reduce the maximum available vertical lift.

One way to determine ETF is by utilizing a baseline engine power model providing a correlation of a corrected engine temperature to corrected engine torque. A specific conventional technique for determining an ETF specific to a particular aircraft engine. The technique further includes determining ETF capable of considering certain operating conditions (e.g., internal gas pressures) and/or ambient conditions of the aircraft engine.

One shortcoming of the traditional approach discussed above is the effect on engine performance of PAM ingestion. At higher altitudes, the intake of PAM may be minimal. However, for engines operating for sustained periods of time at low altitudes, such as military aircraft, an accumulation of PAM from the air can substantially reduce engine power. Embodiments of the present disclosure address the above shortcomings in the conventional technique.

The embodiments were derived from an observation that by slightly repositioning an aircraft, flying in a sand-dense environment, can substantially reduce the amount of sand particles ingested by the engine. For example, by changing the position of the aircraft by a few feet or angling it by a few degrees during flight (pitch, roll, and/or yaw) can reduce the amount of sand ingested by its engines by a factor of two or more. The real-time availability of this information can help the pilot determine whether a current mission (or a set of missions) can be successfully completed or whether the mission should be aborted.

FIG. 1 is a schematic cross-sectional view of one embodiment of a gas turbine engine 100 according to the embodiments and may be used as an aircraft engine. The gas turbine engine 100 has an axial longitudinal centerline axis 12 therethrough for reference purposes. The engine 100 includes a turbine core 14 and a fan section 16 positioned upstream thereof. The turbine core 14 typically includes a generally tubular outer casing 18 defining an annular inlet 20. The outer casing 18 further encloses and supports a booster 22 for raising the pressure of air entering the turbine core 14 to a first pressure level.

A high-pressure compressor 24 (e.g., a high-pressure, multi-stage, axial-flow compressor) receives pressurized air from the booster 22 and further increases the pressure of the air. The high-pressure compressor 24 includes rotating blades and stationary vanes directing compressed air within the engine 100. The pressurized air flows to a combustor 26, where fuel is injected into the pressurized air stream and ignited to raise the temperature and energy level of the pressurized air.

The high energy combustion products flow from the combustor 26 to a first (high-pressure) turbine 28 for driving the high-pressure compressor 24 through a first (high-pressure) drive shaft 30. The high energy combustion products then flow to a second (low-pressure) turbine 32 for driving the booster 22 and the fan section 16 through a second (low-pressure) drive shaft 34 that is coaxial with the first drive shaft 30. After driving each of the respective first and second turbines 28 and 32, the combustion products leave the turbine core 14 through exhaust nozzle 36 to provide at least a portion of the jet propulsive thrust of the engine 100.

The fan section 16 includes a fan rotor 38 (e.g., a rotatable, axial-flow fan rotor) that is surrounded by an annular fan casing 46. The annular fan casing 46 is supported from the turbine core 14 by a plurality of substantially radially extending outlet guide vanes 42. In this way, the fan casing 40 encloses the fan rotor 38 and the fan rotor blades 44. A downstream section of the annular fan casing 46 extends over an outer portion of the turbine core 14 defining a secondary, or bypass, airflow conduit 48 providing additional jet propulsive thrust.

An initial airflow 50 enters the gas turbine engine 100 through an inlet 52 to the fan casing 40. The initial airflow 50 may include PAM 6. The initial airflow 50 passes through the fan rotor blades 44 and forms a second air flow 54 that moves through the airflow conduit 48 and a second compressed airflow 56 entering the booster 22.

The pressure of the second compressed airflow 56 is increased and enters the high-pressure compressor 24 (arrow 58). After mixing with fuel and being combusted in the combustor 26, the combustion products 60 exit the combustor 26 and flow through the first turbine 28. The combustion products 60 then flow through the second turbine 32 and exit the exhaust nozzle 36 providing a portion of the thrust for the engine 100.

The combustor 26 includes an annular combustion chamber 62 coaxial with the axial longitudinal centerline axis 12, as well as an inlet 64 and an outlet 66. The combustor 26 receives an annular stream of pressurized air from a high-pressure compressor discharge outlet 69. A portion of this compressor discharge air flows into a mixer (not shown). Fuel is injected from a fuel nozzle 80 to mix with the air and form a fuel-air mixture that is provided to the annular combustion chamber 62 for combustion. Ignition of the fuel-air mixture is accomplished by a suitable igniter, and the resulting combustion products 60 flow in an axial direction toward and into an annular, first stage turbine nozzle.

The nozzle is defined by an annular flow channel that includes a plurality of radially extending, circumferentially spaced nozzle vanes 74 that turn the gases so that they flow angularly and impinge upon the first stage turbine blades of the first turbine 28. The first turbine 28 rotates the high-pressure compressor 24 via the first drive shaft 30. The second turbine 32 drives the booster 22 and the fan rotor 38 via the second drive shaft 34.

The annular combustion chamber 62 is housed within the outer casing 18 and fuel is supplied into the annular combustion chamber 62 by one or more fuel nozzles 80. Liquid fuel is transported through one or more passageways or conduits within a stem of the fuel nozzle 80.

During operation, PAM 6 is ingested by the gas turbine engine 100, typically suspended in or mixed in with the initial airflow 50 entering the inlet 52. PAM accumulation is a used as an input for engine analytics. The level and impact of these accumulations is used in evaluating engine service time, wear, and tear, and/or other maintenance schedules.

Thus, the embodiments include environmental PAM sensors 73 (e.g., electrostatic sensors) and techniques for detecting PAM 6 in the engine 100.

Figure 2:
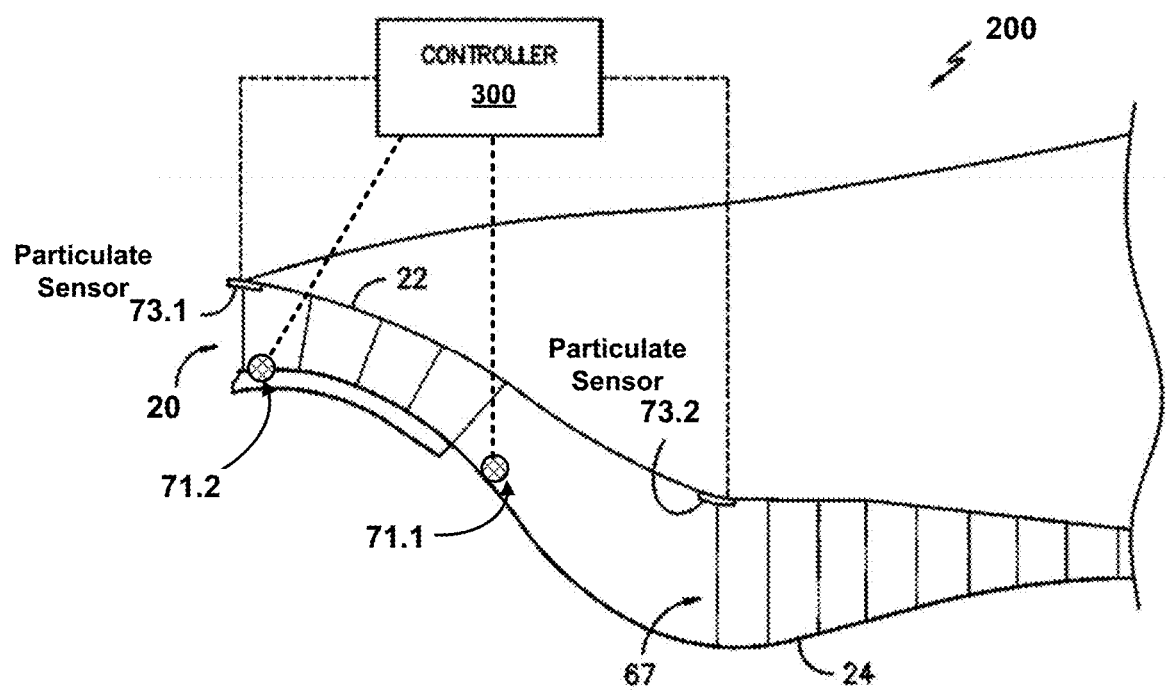
FIG. 2 illustrates exemplary placements of exemplary particulate sensors in an exemplary modules of an exemplary aircraft engine.
Figure 3:
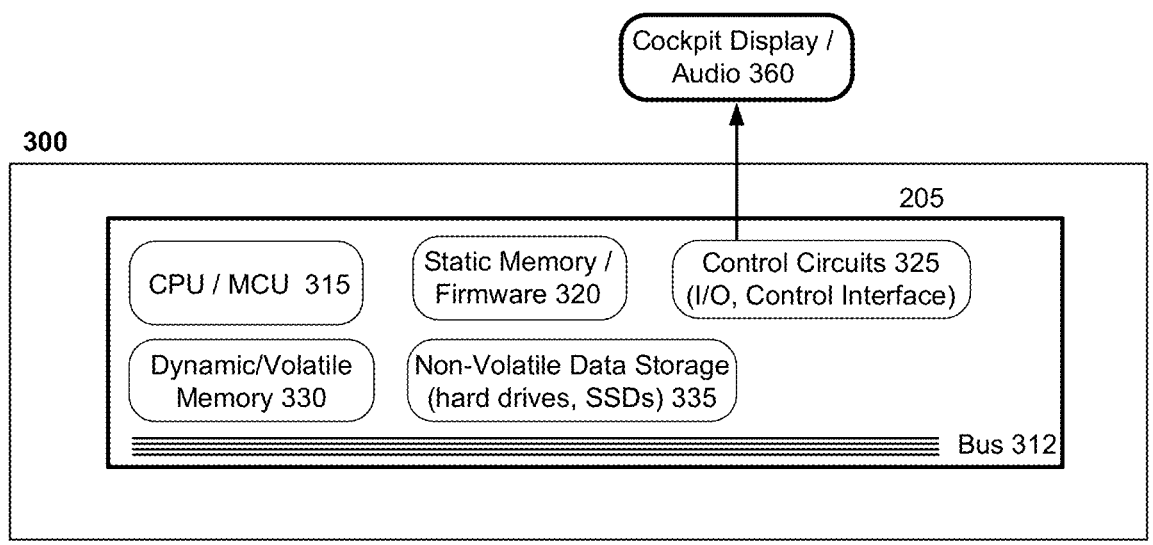
FIG. 3 illustrates an exemplary controller which may be deployed in an aircraft engine according to the embodiments.

In FIG. 2, an exemplary engine sensor system 200 may include one or more gas-path sensors 71 (e.g., air pressure sensors 71.1, temperature sensors 71.2) and engine performance sensors 72 (e.g., rotation speed sensors) for turbine blades of shafts. Multiple engine environmental sensors, such as gas-path and performance sensors 71 and 72 respectively, may be mounted at suitable points within the engine 100, communicatively coupled with a processing system or controller 300 (FIG. 3). The positioning of the gas path sensors 71, the performance sensors 72, and the PAM sensors 73 is exemplary and for purposes of illustration only, as these sensors may be placed at other suitable positions within the engine 100.

For purposes of measuring PAM 6 in the initial airflow 50, PAM sensors 73 (73.1, 73.2, . . . 73.n) may be electrostatic and employed, communicatively coupled to the controller 300. A plurality of PAM sensors 73 may be mounted at suitable points within the engine 100, with FIG. 2 illustrating two of the PAM sensors 73 positioned at the fore sections of the booster 22 and high-pressure compressor 24.

The exemplary PAM sensors 73 are electrostatic sensors. That is, the PAM sensors 73 detect the presence of electrical charge attached to PAM particles. The amount of charge can be measured and correlated to an amount or density of PAM particles. Each of the PAM sensors 73 is configured for mounting to the engine 100 in an area prone to PAM 6 being in the initial airflow 50.

A sensing face of one or more of the PAM sensors 73 is exposed to the initial airflow 50 and configured to detect the PAM 6. The PAM sensors 73 may also include an internal electrode and amplifier configured within a sensing portion. PAM 6, in the form of charged dust particles, may flow past the sensing face of the one or more of the PAM sensors 73. The charged dust particles induce motion of electrons therein and facilitate detection by the amplifier to indicate a level of the charge associated with the PAM 6 flowing past the sensing face.

Although the exemplary PAM sensors 73 are electrostatic sensors, other types of sensors can be used and would be within the spirit and scope of the present disclosure. For example, other types of sensors could include optical and acoustic sensors. Optical and acoustic sensors, using techniques known to those of skill in the art, may respectively detect levels of opacity and acoustic signatures of sand or PAM particles in correlation with sand or PAM densities. Optical sensors may also identify discolorations of metal surfaces and/or changes in reflectivity of interior engine surfaces. The discolorations are indicative of PAM 6 melted onto, or otherwise adhered to, components within the engine 100.

Other forms of PAM or particulate sensors may be used that deliver a signal indicative of one or more of a density, a flow rate, a mass, a speed, and/or a volume of PAM 6 detected in the engine 100. Alternative sensors may be used to identify static accumulations of the PAM 6 on components within the engine 100.

By way of example, the PAM sensors 73 may also be spectrographic to detect specific types (i.e., atomic or molecular compositions) of PAM 6.

In other examples, the PAM sensors 73 may detect PAM 6, in the form of airborne aerosol particles, ice crystals, pollutants, and/or volcanic ash within the engine flow path. The PAM sensors 73 may be configured to alert an engine controller 300 (see FIG. 3 below) in the event of such detection. The PAM sensors 73 may also provide a continuous stream of real-time data 403 (see FIG. 4 below) is PAM 6 is not detected. Further, the PAM sensors 73 may be configured to detect internally generated PAM and alert the controller 300.

Figure 4:
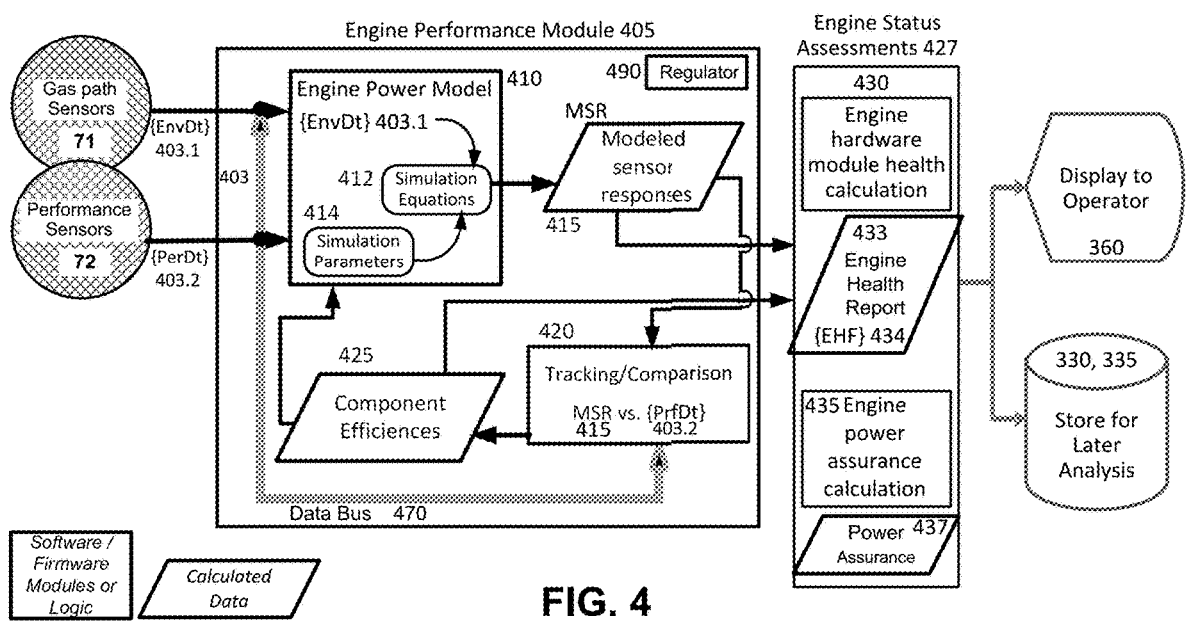
FIG. 4 illustrates elements of an exemplary engine power, health, and maintenance system according to the embodiments.

For example, referring to FIG. 4, received real-time data 403 may be categorized for purposes of calculation. A first subset of the sensor data may be referred to real-time environmental data {EnvDt} 403.1. This first subset will typically reflect an interior environment of the engine 100 and gas path (such as temperatures) but may also include data pertaining to performance of specific engine parts, such as a current bleed air factor. Real-time environmental data 403.1 may also include overall aircraft environment, such as exterior temperature, aircraft velocity, aircraft altitude, icing conditions, exterior wind speeds, and similar data.

A second subset of the sensor data may be referred to as real-time performance data {PrfDt} 403.2. Real-time performance data 403.2 is typically indicative of the measured raw performance of various engine components.

FIG. 3 is a system level diagram of an exemplary engine controller 300, such as a digital computer. The engine controller 300 may execute computer code enabling the aircraft to sense the PAM 6, implement engine performance checks, navigation guide techniques, and maintenance assessments. For example, the engine controller 300 may be a dedicated controller implementing digital control and operations of the engine 100.

In an alternative embodiment, the engine controller 300 may be a Health Monitoring Unit (HMU) that monitors multiple aspects of aircraft performance, such as engine performance. In the embodiments, the controller 300 may be a remote computer, such as a ground-based computer, or satellite-based computer, receiving engine data from the engine 100.

The controller 300 includes a printed circuit board (PCB) 305, or motherboard, interconnected to other controller components. The PCB 305 includes a central processing unit (CPU) 315 that provides for overall operational control of the controller 300. This includes, but is not limited to, receiving data from the PAM sensors 73, the gas-path sensors 71, and the engine performance sensors 72 and sending data, for example, to a cockpit display 360. The CPU 315 is also configured to perform the arithmetic and logical operations necessary to implement the various sensing techniques described herein.

The controller 300 also includes static memory/firmware 320, control circuits 325, a dynamic memory 330, and/or non-volatile data storage 335. The control circuits 325 may perform a variety of tasks, including data and control exchanges, as well as input/output (I/O) tasks, access to system data bus 312, network connection operations etc. The control circuits 325 may also control or interface with non-volatile data storage 335, and interface with the sensors 71, 72, and 73 and with other aircraft components. The control circuits 325 may also support such functions as external I/O, such as universal serial bus (USB) ports, wireless communications, etc.

The system data bus 312 provides for data communications among the CPU 315, the static memory 320, the dynamic memory 330, and non-volatile data storage 335. A display 360 (e.g., cockpit informational system), which may be visual display screen and/or audio, may be communicatively coupled with the controller 300 to present flight data to an aircraft operator. The flight data displayed on the display 360 may include indications of engine power performance and/or indications of maintenance requirements for the aircraft engines. Voice, mechanical, or tactile input means may also be communicatively coupled with the controller 300 to enable operator control thereof.

FIG. 4 illustrates elements of an exemplary combined software-processing-module diagram and data flow for an engine power, health, and maintenance system (EPHMS) 400. The EPHMS 400 assesses aircraft engine hardware health calculations module 430 and provides for engine power assurance calculations (e.g., via an engine power assurance calculation module 435) of a specific aircraft gas turbine engine 100. A data bus 470 (implemented as hardware or virtually in software), may transmit data between the sensors 71, 72, 73, various models 410, 425, and outputs of engine performance module 405. A sensor regulator 490 calibrates operation of sensors 71, 72, and 73.

In the exemplary EPHMS 400, an engine performance module 405 receives during aircraft flight, real-time data 403 from the sensors 71, 72, and 73. The engine performance module 405 can be implemented in part as an engine power model 410. In various embodiments, the engine power model 410 may be based on a mathematical model with suitable simulation techniques 412 (and/or simulation lookup tables), with simulation parameters 414 to model expected engine behavior.

The engine power model 410 generates, in real-time, a set of modeled sensor responses (MSRs) 415, based on the real-time data 403. The MSRs 415 are also known as the engine power capabilities. The real-time data 403 and outputs from the engine performance module 405 are examples only. The real-time data 403 received as inputs above, for example, could represent various other engine parameters.

The real-time data 403 is obtained in real-time from some or all of the sensors 71, 72, and 73. The engine power model 410 simulates the expected engine performance based on the simulation techniques 412 and modeling simulation parameters 414. The simulation techniques 412 will typically be parameterized with suitable engine performance/operational parameters known in the art.

Persons skilled in the relevant arts will recognize that if the simulation parameters 414 are altered (e.g., modified during flight) this would alter the MSRs 415. The engine power model 410 yields as output one or more data streams for the MSRs 415.

The engine performance module 405 includes a tracking and comparison module 420. The tracking/comparison module 420 tracks the real-time data 403 from the sensors 71, 72, and 73 and the MSRs 415. Where the MSRs 415 differ from the real-time data 403, and in particular, from real-time performance data 403.2, indicates that some components of the aircraft engine 100 are not performing at expected efficiency. Responsive to such a determination, the tracking/comparison module 420 determines and outputs component efficiencies 425 for appropriate engine components.

The component efficiencies 425 may be determined as efficiency adjustments for specific engine hardware components of the engine 100. For example, an engine compressor may be currently operating at only 94% of an expected efficiency, or at 96% of an expected efficiency.

The component efficiencies 425 may be identified via adjustments to various simulation parameters 414. Any parameters to be adjusted will be specific to the particular simulation technique engine power employed by the engine power model 410. For example, the engine power model 410 may include one or more techniques (e.g., linear or straight-line mathematical expressions) indicative of expected engine turbine speed as a function of engine temperature. An adjustment to engine component efficiencies 425 may be reflected in the lowering of such a turbine-speed/engine line, indicating that at any given engine temperature a turbine blade is rotating at a lower-than-expected angular speed.

The engine performance module 405 continually adjusts the simulation parameters 414 of the engine power model 410 so the MSRs 415 converge on the real-time performance data 403.2. In this way, the MSRs 415 substantially reflecting the current component efficiencies of the engine 100, consider declines in engine power and performance over time. Based on a continually updated and accurate engine power model 410, the engine performance module 405 can accurately predict engine health and engine performance for the near future.

In FIG. 4, an engine status assessments module 427 receives output data from the engine performance module 405, including from the MSRs 415 and the determined component efficiencies 425. The engine status assessments module 427 outputs engine health factors (EHF) 434 indicative of overall health of the engine 100.

In general, the EHFs 434 indicate a functional limitation on engine performance, in view of the actual, current condition of engine components. By way of example, the EHFs 434 may be measured in terms of a variety of specific engine performance factors, including torque factor, temperature, thrust, shaft speed, fuel flow, etc.

An engine hardware health calculation module 430 generates an engine health report 433. The engine health report 433 provides measures of the health of one or more engine components, or health of the engine 100 as a whole. The engine health report 433 may indicate component efficiencies 425 for the various engine health metrics, including a rate of decline of engine power over time etc. Other indicators of engine health may be determined as well. The engine health report 433 may include summary values for engine health which are determined based on various combinations of the EHF 434.

An aggregate engine health value may be determined based on multiple factors, such as a weighted average of efficiencies of different engine components, and engine power capabilities. The aggregate engine health value may also be based on past or projected rate of decline of the engine's power capability to determine a projected date when engine maintenance will be required based on a rate of engine power decline.

An engine power assurance calculation module 435 generates an engine power assurance report 437 as a function of PAM ingestion and corresponding reductions in engine power if PAM ingestion continues. The assurance report indicating whether the engine 100 can maintain sufficient power for flight under various aircraft stress conditions created by the PAM ingestion.

The EPHMS 400 may be configured to output data from the engine status assessments module 427 and present this data to the aircraft operator via the display 360. The data may also be stored in the dynamic memory 330 and/or the data storage 335. In this way, all engine health assessments (e.g., the engine health report 433, the engine power assurance report 437) of the EPHMS 400 may enable the aircraft operator to modify current aircraft operations and enable aircraft maintenance personnel to anticipate future maintenance requirements.

Figure 5:
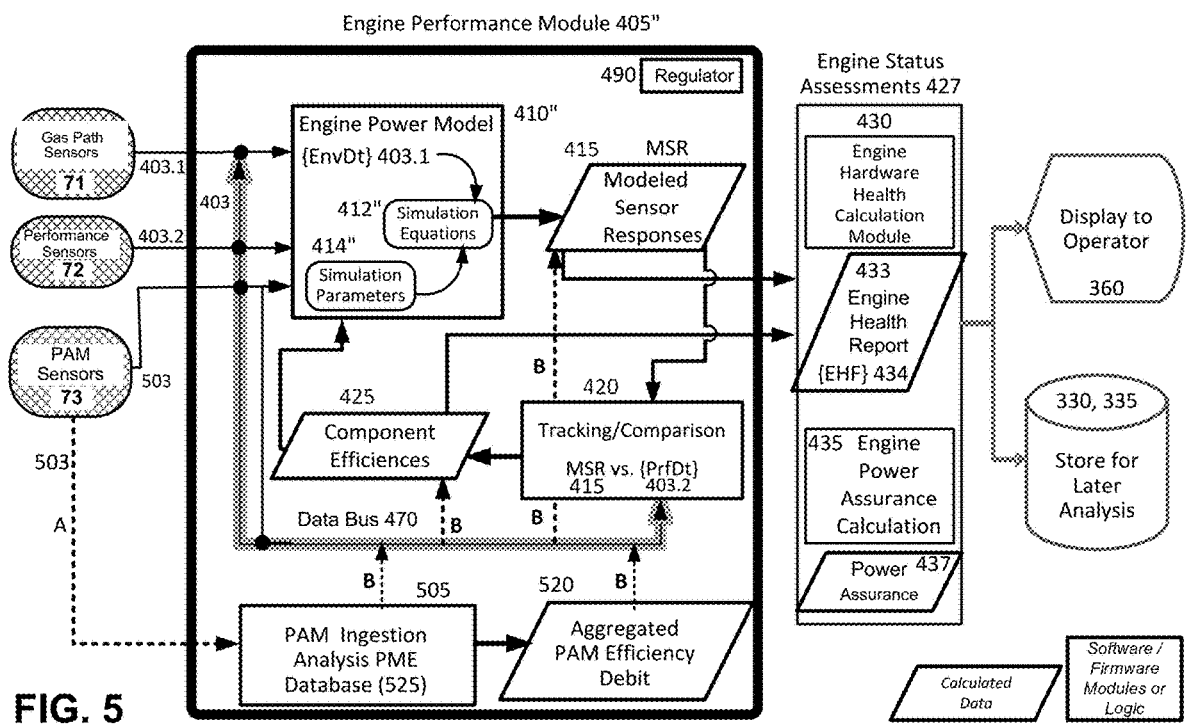
FIG. 5 illustrates elements of an exemplary engine power, health, and maintenance system according to the embodiments.

FIG. 5 presents a combined software-processing-module diagram and data-flow diagram for an alternative EPHMS 500 for assessing an aircraft engine-module health report 433, and for providing for engine power assurance calculations 437 of a specific aircraft engine, such as the engine 100. Unlike the exemplary system 400 discussed above, the alternative system 500 and method (i) provides for measuring PAM that may enter the aircraft engine 100 and (ii) further provides for assessing the impact on engine maintenance and efficiency due to the PAM entering the engine 100 during flight.

In the embodiments, many elements of EPHMS 500 are substantially similar to the elements of EPHMS 400. The substantially similar elements will not be described again in detail here.

In the EPHMS 500, an engine performance module 405" receives, in near real-time during aircraft flight, engine data 403 from engine gas path sensors 71 and the engine performance sensors 72. The EPHMS 500 also includes PAM sensors 73. As discussed above, the PAM sensors 73 detect PAM 6 drawn into the engine 100 during flight and that may (i) accumulate on engine components along the gas path(s) of the engine 100, (ii) block or partially block various gas channels within the engine 100, and (ii) reduce or increase temperatures and/or pressures at various points along the gas path. As a result, PAM 6 can influence the power and efficiency of components within the engine 100.

In an embodiment, the PAM sensors 73 deliver a substantially sustained and continuous real-time PAM data stream 503 during the flight of an aircraft. By way of example, raw PAM data 503 may be received directly by an engine power model 410". The Engine Power Model 410" may be implemented with simulation equations 412" and simulation parameters 414" that include suitable modifications to consider the effects of PAM on engine performance, based on the PAM data stream 503. In some embodiments the simulation equations 412" may be used to determine reductions in compressor efficiencies as a function of PAM density, particulate size, particulate mass, or particulate composition (PDSMC) and possibly other particulate data 503 from PAM sensors 73. The simulation equations may also be used, by example, to (i) increase the load on turbine blades as a function of PDSMC, (ii) decrease combustion chamber burn efficiency as a function of PDSMC, and (iii) decrease gas flow rate through the engine or engine components due to the PDSMC.

In a manner analogous to steps discussed above in conjunction with exemplary EPHMS 400 (see FIG. 4), the engine performance module 405" of EPHMS 500 may employ a tracking and comparison module 420 to compare modeled sensor responses 415 and real-time performance data 403.2. Based on the comparisons, various engine component efficiencies 425 may be determined, that are used to modify the simulation parameters 414".

The simulation equations 412" may employ calculations, and employ simulation parameters 414", pertaining in combination to both to particulate data stream 503 and non-particulate data 403 from gas path sensors 71 and performance sensors 72.

Along an alternative path (A), the engine power model 410" may only process data from gas path sensors 71 and performance sensors 72 (as per exemplary EPHMS 400, discussed above). Real-time sensor data stream 503 from the PAM sensors 73 may be received by a PAM ingestion analysis module 505. The PAM analysis ingestion module 505 may maintain a running log, count, or data record of the sensed PAM flow over time (which may include particulate density, particulate volume, mass, composition, and other data). Based on the PAM data stream 503, the PAM ingestion analysis module may calculate an aggregate efficiency debit 520 for the engine 100 or its various internal components.

For example, the aggregate efficiency debit 520 may be represented in percentage terms, indicating that a selected engine component for example, a compressor) will operate at only 95% efficiency, or 93% efficiency, due to PAM, as compared with the same compressor's performance in the absence of PAM. The aggregate efficiency debit 520 may then be employed to modify the MSRs 415 and/or the component efficiencies 425.

By way of background, the engine performance module 405 continually adjusts the parameters 414 of the engine power model 410" so that the engine power model output 415 converges on the real-time performance data 403.2. In this way, the present system and method can provide real-time simulation data substantially considering the current component efficiencies of the engine 100. This consideration is a function of declines in engine power and performance due to PAM ingestion by the engine 100.

In some embodiments of the present system and method, component efficiencies 420 may be assessed as a functional dependence of one engine performance parameter with respect to another, including for example and without limitation engine temperature as a function of engine torque factor, engine shaft speed, or engine thrust (where, for example, for a given engine thrust a lower temperature indicates better engine health/efficiency as compared with a higher temperature). The component efficiencies 420 may also be a function of engine thrust or engine torque factor as a function of engine temperature (where, for example, at a given engine temperature, a higher thrust, higher shaft speed, or higher engine torque factor indicates better engine health/efficiency as compared with a lower thrust or lower torque factor).

In some embodiments, the engine performance module 405" employs the updated engine power model 410." That is, the engine power module 405" employs the updated simulation parameters 414" to extrapolate engine performance. For example, based on the engine power model 410", the engine performance module 405" may identify a maximum power, a maximum lift, or a maximum thrust which the engine 100 can provide under hypothetical, non-current mission conditions.

In another example, based on the engine power model 410", the engine performance module 405" may identify a maximum power, a maximum lift, or a maximum thrust which the engine 100 can provide under worst-case mission conditions (such as maximum desired aircraft load, maximum or minimum exterior temperatures, maximum exterior winds, and other maximal stress mission conditions).

By factoring the PAM data stream 503 in the simulation equations 412" and the simulation parameters 414", the engine power model 410" can provide a more reliable simulation of engine performance than could be provided without the PAM data stream 503. As a result, the inclusion of PAM measurements allows for a more reliable extrapolation of engine power to various potential or hypothetical environments and mission stresses (as compared with an engine power model 410 of the EPHMS 400, that does not factor in PAM measurements.

The engine health report 433, and in particular the EHFs 434, may include raw data or summary data for particulate matter ingestion in the course of a single flight. The engine health report 433 may also include summary data for PAM ingestion over multiple flights. This data may assist maintenance personnel further identify an overall engine health and help determine when engine maintenance may be required. The report may also identify PAM intake as summarized or categorized in various ways, such as by terrains, altitudes, mission types, or atmospheric conditions that resulted in the greatest dust accumulation or least dust accumulation. Such reporting may be an aide to future mission planning.

In FIG. 5, the engine power assurance calculation module 435, generating an engine power assurance report 437, may consider the effects of recent PAM ingestion and further extrapolate anticipated reductions in engine power or loss of engine power if PAM ingestion continues over time. On a short-term time frame, such as minutes or hours, the engine power assurance report 437 may indicate if the engine 100 will be able to maintain sufficient power for flight under various aircraft stress conditions, including when the aircraft is flying through PAM-heavy atmospheric environments.

In the embodiments, the EPHMS 500 may be configured to take the output data from the engine status assessments 427 and present them to an aircraft operator (a pilot or copilot, or maintenance person) via a cockpit display 360. By way of example, this output data may possibly be in the form of an alert message or warning regarding limited engine power. This output data may also be stored for later analysis in monitor/controller storage 330, 335. In this manner, the engine status assessments 427 of the EPHMS 500 may be employed both to enable a pilot to modify the current aircraft operations or usage and enable aircraft maintenance personnel to anticipate needed aircraft maintenance.

In some embodiments, the sensing of PAM debris is directed towards the objective of enhancing engine power assurance in helicopters. Helicopter need to reach and sustain a vertical lift threshold of power to lift the helicopter. In some embodiments, the EPHMS 500 can predict how much power the engine can generate at its limits. In view of engine decline over time, the EPHMS 500 can determine if the engine will be able to maintain sufficient lift in the near future. For helicopters, it is important to determine if the helicopter will be able to maintain lift when pushed to extreme flight/power demands.

Engine Power Assurance may be measured by various metrics including torque with speed normalization, horsepower with temperature normalization, and actual capability vs. specified capability. One means to assess available aircraft power is to test a helicopter at regular intervals, for example, every six months. However, but this may not facilitate anticipating shorter-term failures of the aircraft engine, particular in high-stress flight environments. Flight stresses/demands can include aircraft weight, additional loads, flight speed, and winds etc.

In the example of FIG. 5, current real-time performance data 403.2 is used to predict to the engine power assurance, calculate the maximum engine power currently available, and extrapolate if the available engine power is sufficient to meet potential mission demands.

During aircraft engine operations, a tracking/comparison filter 420 adjusts the simulation parameters 414" so that the MSRs output 415 matches actual real-time performance data 403.2. This results in an optimized engine power model 410". The optimized engine power model 410" may then be run to its limits. Stated another way, the optimized engine power model 410" can be run with maximum flight stress conditions, such as maximum flight speed, maximum aircraft load, maximum winds, maximum or minimum exterior temperatures, and other environmental "maxes." This helps determine if the actual engine 100 can sustain flight under those conditions.

PAM of various sizes may also result in generally higher engine temperatures downstream, reducing an engine's "efficiency scalar." embodiments of the present system and method, may maintain, implement, or store a PAM database 525 (PMEDB or PMD) of debris types, and the impact of different kinds of debris on components of the engine 100. By way of example, the PMEDB 525 may be an element of simulation parameters 414" or be an element of the PAM ingestion analysis module 505.

Factors or data that may be recorded in such the PMEDB 525 may include, for example, numeric data indicating that PAM of certain types (of a certain size or a particular composition) may be more likely to damage a first module X of the engine 100 and less likely to damage a different module Y of the engine. Restated: PAM of size range 'A' may have the most effect on engine compressors, particles of a different size range 'B' may have the most effect on engine blades, and similar data.

The PMEDB 525 is determined based on past evidence, and can bias component efficiency parameters for compressors, turbines, blades, combustion chambers, and other elements. In other embodiments, the PMEDB 525 may include some PAM environmental history for known geographic regions. For example, the PMEDB 525 may include known PAM levels for certain cities, for deserts, and other regions of expected aircraft use. Such data may be added to, or augment, the PAM data stream 503 as input to the engine power model 410".

The PMEDB 525, or alternatively the engine power model 410" itself, may also include cumulative data or cumulative models for known effects of PAM on the engine 100.

In some embodiments of the present system and method, then, power assurance and/or a health state of the engine 100 is determined at least in part based on:

(1) Detection of PAM entering the engine 100, which may be determined by the PAM sensors 73 and without limitation: electrostatic sensors, magnetic sensors, spectrographic sensors, and optical sensors; and (2) Feedback loops which employ sensed engine data to modify the simulation parameters 414" to reflect actual performance of an aging engine. Stated another way, the current system and method biases the engine simulation parameters 414", based on the environmental history of the aircraft, including a history of PAM intake, resulting in an updated engine power model 410".

The engine power model 410" may be continually updated, as needed, over the lifetime of the engine. In an embodiment, and following thorough engine maintenance, the engine model 410", and in particular the engine model simulation parameters 414", may be reset to an initial or default state for a new engine, a nominal engine, or an average engine.

Figure 6:
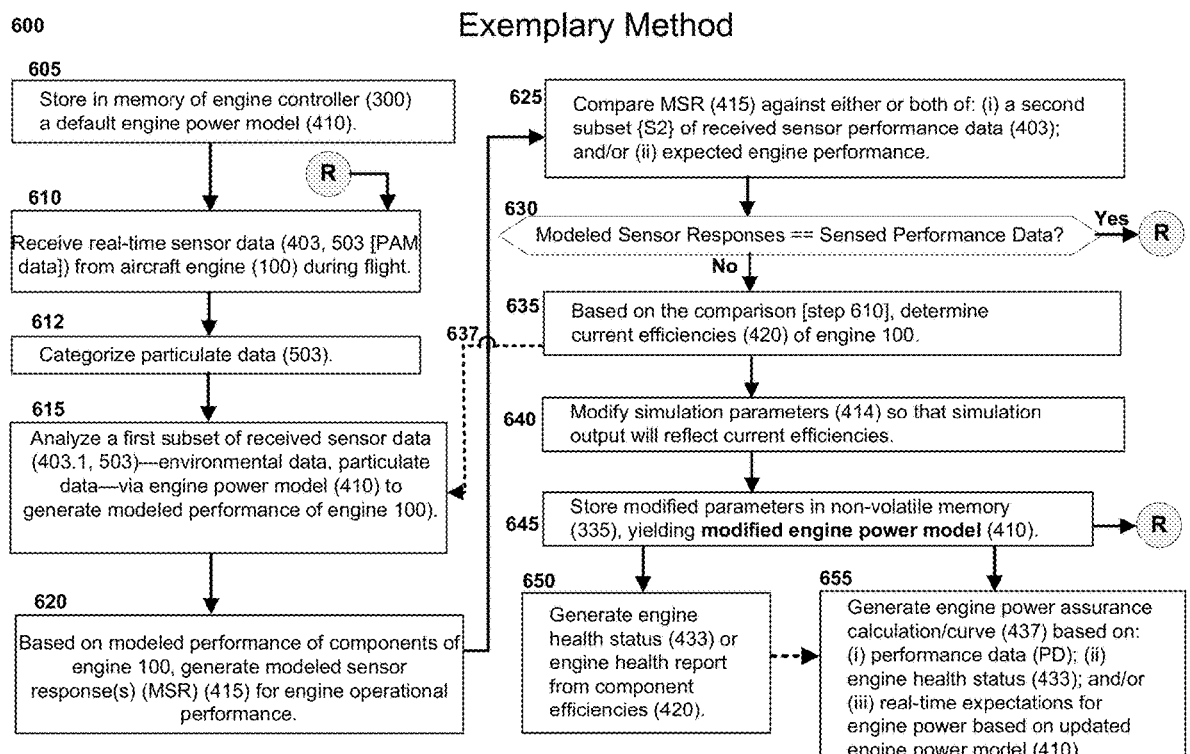
FIG. 6 is a flow chart of an exemplary method for assessing engine power, health, and maintenance requirements.

FIG. 6 is a flowchart illustration of an exemplary method 600 for assessing engine power, health, and maintenance requirements based in part on measurements of PAM drawn into the aircraft engine 100 during flight. The method may be executed for example by a monitor/controller 300 of the aircraft engine 100 based on the data stream 503 from the engine's PAM sensors 73 and other engine sensors 71 and 72. In an alternative embodiment, some steps of the method 600 may be performed by a ground-based computational system that receives the real-time data 403 and the data stream 503 from the aircraft engine 100.

The method 600 begins with step 605. In step 605, a baseline engine power model 410 or initial engine power model 410 is stored in a memory of the engine controller 300. Step 605 may be viewed as occurring infrequently, upon a first loading of the engine performance module 405 into a memory 320, 330 of the controller 300 and/or upon occasional software updates. In an alternative embodiment, the step 605 may occur when the engine performance module 405 is loaded from firmware 320 or other non-volatile data storage 335 to dynamic memory 330, for example, when the aircraft (and the controller 300) is powered up.

Referring also to FIG. 4, the baseline engine power model 410/410" (hereinafter simply 410) includes simulation equations 412/412" and/or simulation tables 412/412" (hereinafter simply 412) based on default simulation parameters 414/414" (hereinafter simply 414) for engine performance. These default parameters may reflect the expected performance of a factory-new engine 100, or the expected performance of an engine with some nominal degree of degradation. In some embodiments, nominal degradation may reflect anticipated or known declines in engine performance when the engine is still in nearly optimal condition.

In some embodiments, the default simulation equations 412 and the default simulation parameters 414 may be designed to take into account an expected aging model for the engine. For example, the simulation parameters 414 may be defined as functions of time or functions of cumulative miles traversed by the engine 100. The simulation parameters 414 may be listed where time/cumulative-miles-traveled is a parameter, such that the engine power model 410 would automatically vary over days, weeks or months, according to expected declines in engine performance. Such "aging equations" or "aging tables" may be based on a variety of sources, including historical information about similar engines, and/or historical information about identical engines that have already been in field use for some time.

In an embodiment of the present system and method, the simulation parameters 414 may be stored represented in the simulation equations 412 as variables, with specific values loaded into the simulation equations 412 at run time. In this way, the simulation parameters 414 may be varied over the lifetime of the engine 100, so that the values of the variables in the simulation equations 412 may be altered in the course of the method 600.

The method 600 continues with step 610. In step 610, the controller receives real-time data 403.1, 403.2, and the data stream 503 from the aircraft engine sensors 71, 72, and 73 during flight. The real-time environmental data 403.1, real-time performance data 403.2, and the data stream 503 may include environmental data (such as temperatures), general airplane environmental data (such as aircraft velocity, aircraft altitude, humidity, exterior aircraft temperature) and possibly gas flow speeds and/or gas pressures. The real-time environmental data 403.1 may also include the rate of flow of fuel into the engine 100.

The sensor data further includes raw real-time performance data 403.2, including, for example, rotation speeds of turbines and engine shafts. In some embodiments, the real-time performance data 403.2 may include gas flow speeds and/or gas pressures.

In an optional step 612, the method 600 may categorize types of particles flowing into and along the gas path based on the PAM data stream 503. For example, PAM data stream 503 may be categorized according to the sizes or range of sizes of currently detected particles, the masses of detected particles, and/or the composition of detected particles. In an embodiment, the raw data may include particulate distribution data according to the sizes, mass, and material of the detected particles.

In some embodiments of method 600, the PAM data stream 503 may further include an indication of an amount of PAM entering and exiting the engine 100. In this manner, the method 600 may determine a volume or mass of PAM trapped in the engine 100 rather than being released in the course of airflow through the flow path the engine 100.

In the embodiments, the controller 300 may have stored previously determined data indicating which components of the engine 100 are affected, and to what degree they are affected, according to categories of PAM particles, such as particulate size, mass, composition, or density. If such previous data has been stored, then optional step 612 may entail making an initial determination of which engine modules are affected, and to what degree, by the current composition of particulate matter in the gas path of the engine 100.

In a step 615, a subset of the received sensor data, typically real-time environmental data 403.1 and PAM data stream 503, is used as data input to engine simulation equations 412 and/or engine simulation tables 412. In some embodiments, real-time performance data 403.2, such as rotation speeds of shafts, turbines, or compressor blades may also be considered as input data. Based on the input data, the simulation equations 412 are used to generate model performance of various components of the engine 100.

In step 620, based on the modeled performance of the engine 100, the method 600 generates MSRs 415 for engine operational performance. These MSRs 415 are values that the engine power model 410 predicts values associated with the real-time performance data 403.2 that the engine sensors are anticipated to detect (according to the simulation equations 412 and current simulation parameters 414).

In step 625, the method compares modeled sensor response (415) against at least one of (i) the received real-time performance data 403.2 and (ii) expected engine efficiencies (which may be stored for example as part of simulation parameters 414 or in other memory associated with the engine performance module 405. The method continues with step 630.

In step 630, the method determines if the MSRs 415 are substantially equal to the sensed real-time performance data 403.2 and/or expected engine efficiencies, as defined by threshold equality parameters or threshold equality ranges that are stored in memory associated with tracking/comparison module 420. Such ranges are determined by system engineers based on experience, past engine histories, technical and legal requirements, standards set by various standards organizations, and by other criteria.

If the MSRs 415 and the received real-time performance data 403.2 are substantially equal, the method continues by looping back to the step 610, receiving further sensor data. If the differences between the modeled sensor responses 415 and the received real-time performance data 403.2 are not equal or exceed an allowed threshold, the method continues with step 635.

In step 635, and based on the current real-time performance data 403.2, the real-time environmental data 403.1, the method determines the current efficiency levels of the engine 100 and/or its internal components. In step 640, the method modifies the simulation parameters 414 so that output 415 of the engine power model 410 reflects the real-time efficiencies determined in step 635. This action ultimately results in an update to the engine power model 410.

In step 640, the method 600 modifies the simulation parameters 414 based on a variety of stored formulas and calculations which translate data 403.1, 403.2, and 503 and the actual component efficiencies 425 into suitable values for simulation parameter 414. In another embodiment of step 640, the determination of suitable values for the simulation parameters 414 may be an iterative process 637 where step 635 loops back to step 615 for a repeated of the simulation and comparison steps 615, 620, 625, 630, 635, 640.

Following step 640, the method 600 continues with step 645. In step 645, the modified simulation parameters 414 are stored in non-volatile data storage (335) and are used in steps 615 and 620. Following step 645, the method 600 may return to step 610, receiving sensor data, and continue with successive steps.

The method may also continue with steps 650 and 655. In step 650, the method 600 generates engine health report 433 as a function of component efficiencies 420. In step 655, the method 600 generates engine power assurance calculation 435/power assurance 437 based on one or more of: (i) the real-time performance data 403.2, (ii) engine health 433, and/or (iii) real-time expectations for engine power based on an updated engine power model 410.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

A tangible computer-readable, non-transitory storage medium storing instructions that, when executed by an engine controller of an aircraft causes the engine controller to execute a method. The method includes receiving from an engine particulate sensor of an engine of the aircraft a measure of an amount of particulate matter in a gas path of the engine during flight of the aircraft and receiving from an engine performance sensor of the engine a measure of engine performance, wherein the measure of engine performance comprises at least one of a temperature of the engine, a torque of the engine, a rotation speed of the engine, and a thrust of the engine. The method also includes determining a current engine efficiency based on the measure of engine performance, determining based on the amount of particulate matter and the measure of engine performance a change in the engine efficiency responsive to the intake of the particulate matter; and determining an engine health factor including a maximum engine torque of the aircraft engine based on the change in engine efficiency as a function of the intake of the particulate matter.

The tangible computer-readable, non-transitory storage medium according to any one of the preceding clauses, wherein the engine health factor comprises determining at least one of the maximum engine torque, a maximum turbine temperature, a maximum shaft speed, and a maximum fuel flow of the aircraft engine.

The tangible computer-readable, non-transitory storage medium according to any one of the preceding clauses, wherein the method further comprises receiving from an engine gas path sensor, a measure of an internal environment of the engine; determining, based on (i) the measure of the internal environment, (ii) the measure of particulate matter, and (iii) the measure of engine performance, a maximum power the engine can generate; and determining if the maximum power exceeds a power assurance threshold indicative of a minimum power required of the aircraft engine.

The tangible computer-readable, non-transitory storage medium according to any one of the preceding clauses, wherein the method further comprises: determining an engine health status based on the measure of particulate matter in the gas path, the measure of engine performance, and the measure of the internal environment.

The tangible computer-readable, non-transitory storage medium according to any one of the preceding clauses, wherein the method further comprises: receiving from an engine sensor associated with a component of the engine, at least one of: (i) a first measure of particulate matter in the engine component; (ii) a second measure of performance of the engine component; and (iii) a third measure of an internal environment of the engine component; and determining from the at least one of the first measure, the second measure, and the third measure, an efficiency of the engine component.

The tangible computer-readable, non-transitory storage medium according to any one of the preceding clauses, wherein the method further comprises: determining a plurality of respective efficiencies of a plurality of respective engine components based on the at least one of a respective first measure, second measure, and third measure for each component of the plurality of engine components; and determining an efficiency of the engine based on the respective efficiencies of the plurality of respective engine components.

The tangible computer-readable, non-transitory storage medium according to any one of the preceding clauses, wherein the method further comprises: determining a modeled engine efficiency based on a parameterized model of engine function; determining if a difference between the modeled engine efficiency and the current engine efficiency exceeds a threshold value; and modifying a value of a parameter of the parameterized engine model if the determined difference exceeds the threshold value, wherein the modified parameter value causes the modeled engine efficiency to differ from the current engine efficiency by no more than the threshold value.

A method for determining an engine health factor of an aircraft engine, comprises: determining, by an engine controller, an engine condition indicative of an engine health during operation of the aircraft engine, the engine condition comprising a measure of an amount of particulate matter detected in the engine during flight; accessing, by the engine controller, a baseline engine power model representative of a nominal aircraft engine with a nominal degradation; modifying, by the engine controller, the baseline engine power model using the determined engine condition, wherein the baseline engine power model is modified responsive to the detected particulate matter; and determining, by the engine controller, an engine health factor based on the modified engine power model and a maximum turbine temperature.

The method according to any one of the preceding clauses, wherein: the baseline engine power model indicates a relationship between an engine torque and a engine temperature; and the engine health factor reflects a modified relationship between the engine torque and a maximum engine temperature.

The method according to any one of the preceding clauses, wherein determining the engine condition indicative of the engine health comprises determining, by the engine controller, a plurality of engine conditions during operation of the aircraft engine, wherein: the plurality of engine conditions comprises the amount of particulate matter; and modifying the baseline engine power model using the determined engine conditions comprises modifying, by the engine controller, one or more parameters of the engine power model.

The method according to any one of the preceding clauses, wherein the plurality of engine conditions further comprises at least two from the group including an engine temperature, an engine pressure, an engine torque, an engine rotation speed, and an engine fuel consumption.

The method according to any one of the preceding clauses, further comprising determining an engine torque factor based on the modified engine power model, wherein determining the engine torque factors comprises extrapolating, by the engine controller, a maximum engine torque available.

A system comprises: an engine controller of an aircraft engine, the controller comprising a microprocessor and a memory; and a plurality of sensors electrically coupled to the aircraft engine, comprising: (i) a particulate sensor configured to measure at least one of (a) particulate matter in a gas path of the engine and (b) accumulated particulate matter in the engine; (ii) a second sensor configured to detect an operational state of the engine; and (iii) a third sensor configured to detect an environmental state of the engine; wherein: the memory is configured to store an engine power model for simulating an operational state of the engine as a function of the environmental state of the engine; the processor is configured to determine an efficiency of the engine based on (i) the engine power model, and (ii) particulate sensor data pertaining to particulate matter in the gas flow, second sensor data of the operational state of the engine, and third sensor data of the environmental state of the engine; and the processor is further configured to extrapolate from the determined engine efficiency a maximum power of the engine under hypothetical flight conditions.

The system according to any one of the preceding clauses, wherein: the memory is initially configured to store a baseline engine power model, and the processor is further configured to modify the baseline engine power model over time based on at least one of (i) a change in engine efficiency over time, and (ii) a comparison of a modeled operational state of the engine and a sensed operational state of the engine.

The system according to any one of the preceding clauses, wherein the processor is further configured to modify the baseline engine power model based on at least one of (i) a modeled effect of particulate matter on overall engine efficiency, and (ii) a modeled effect of particulate matter on a hardware component of the engine.

The system according to any one of the preceding clauses, wherein the processor is further configured to: receive from an engine sensor associated with a component of the engine at least one of: (i) a first measure of an amount of particulate matter in the engine component; (ii) a second measure of a performance of the engine component; and (iii) a third measure of an internal environment of the engine component; and determine from the at least one of the first measure, the second measure, and the third measure an efficiency of the engine component.

The according to any one of the preceding clauses, wherein the processor is further configured to: determine a plurality of respective efficiencies of a plurality of respective engine components based on the at least one of a respective first measure, second measure, and third measure for each component of the plurality of engine components; and determine an efficiency of the engine based on a combination of the efficiencies of the plurality of respective engine components.

The system according to any one of the preceding clauses, wherein the processor is further configured to: determine a modeled engine efficiency based on a parameterized model of engine function; determine if a difference between the modeled engine efficiency and a current engine efficiency exceeds a threshold value; and modify a value of a parameter of the parameterized engine model if the determined difference exceeds the threshold value, wherein the modified parameter value causes the modeled engine efficiency to differ from the current engine efficiency by no more than the threshold value.

The system according to any one of the preceding clauses, wherein the second sensor is a performance sensor, and the third sensor is a gas path sensor.

The system according to any one of the preceding clauses, wherein the plurality of engine components includes at least one from the group including an engine compressor, an engine combustor, and an engine turbine.

What is claimed is:

1. A tangible computer-readable, non-transitory storage medium storing instructions that, when executed by an engine controller of an aircraft, causes the engine controller to execute a method comprising:
   receiving from an engine particulate sensor of an engine of the aircraft, a measure of an amount of particulate matter in a gas path of the engine during flight of the aircraft;
   receiving from an engine performance sensor of the engine, a measure of engine performance, wherein the measure of engine performance comprises at least one of a temperature of the engine, a torque of the engine, a rotation speed of the engine, or a thrust of the engine;
   determining a current engine efficiency based on the measure of engine performance;
   determining based on the amount of particulate matter and the measure of engine performance, a change in the current engine efficiency responsive to an intake of the particulate matter; and
   determining an engine health factor including a maximum engine torque of the engine based on the change in engine efficiency as a function of the intake of the particulate matter.

2. The tangible computer-readable, non-transitory storage medium of claim 1, wherein the engine health factor comprises determining at least one of the maximum engine torque, a maximum turbine temperature, a maximum shaft speed, or a maximum fuel flow of the engine.

3. The tangible computer-readable, non-transitory storage medium of claim 1, wherein the method further comprises:
   receiving from an engine gas path sensor, a measure of an internal environment of the engine;
   determining, based on (i) the measure of the internal environment, (ii) the measure of particulate matter, and (iii) the measure of engine performance, a maximum power the engine can generate; and
   determining if the maximum power exceeds a power assurance threshold indicative of a minimum power required of the engine.

4. The tangible computer-readable, non-transitory storage medium of claim 3, wherein the method further comprises:
   determining an engine health status based on the measure of the particulate matter in the gas path, the measure of engine performance, and the measure of the internal environment.

5. The tangible computer-readable, non-transitory storage medium of claim 1, wherein the method further comprises:
   receiving from an engine sensor associated with a component of the engine, at least one of: (i) a first measure of particulate matter in the component; (ii) a second measure of performance of the component; of (iii) a third measure of an internal environment of the component; and
   determining from at least one of the first measure, the second measure, or the third measure, an efficiency of the component.

6. The tangible computer-readable, non-transitory storage medium of claim 5, wherein the method further comprises:
   determining a plurality of respective efficiencies of a plurality of respective engine components based on the at least one of the first measure, the second measure, or the third measure for each component of the plurality of respective engine components; and
   determining an efficiency of the engine based on the plurality of respective efficiencies of the plurality of respective engine components.

7. The tangible computer-readable, non-transitory storage medium of claim 1, wherein the method further comprises:
   determining a modeled engine efficiency based on a parameterized model of engine function;
   determining if a difference between the modeled engine efficiency and the current engine efficiency exceeds a threshold value; and
   modifying a value of a parameter of the parameterized model of engine function if the difference exceeds the threshold value, wherein the value of the parameter causes the modeled engine efficiency to differ from the current engine efficiency by no more than the threshold value.

8. A method for determining an engine health factor of an aircraft engine, comprising:
   determining, by an engine controller, an engine condition indicative of an engine health during operation of the aircraft engine, the engine condition comprising a measure of an amount of particulate matter detected in the aircraft engine during flight;
   accessing, by the engine controller, a baseline engine power model simulating expected engine performance of a nominal aircraft engine with a nominal degradation;
   modifying, by the engine controller, the baseline engine power model using the engine condition, wherein the baseline engine power model is modified responsive to the particulate matter to generate a modified engine power model; and
   determining, by the engine controller, an engine health factor based on the modified engine power model and a maximum turbine temperature.

9. The method of claim 8, wherein:
   the baseline engine power model includes a correlation between an engine torque and an engine temperature; and the engine health factor includes a correlation between the engine torque and a maximum engine temperature.

10. The method of claim 8, wherein determining the engine condition indicative of the engine health comprises determining, by the engine controller, a plurality of engine conditions during operation of the aircraft engine, wherein:
the plurality of engine conditions comprises the amount of particulate matter; and
modifying the baseline engine power model using the plurality of engine conditions comprises modifying, by the engine controller, one or more parameters of the baseline engine power model.

11. The method of claim 10, wherein the plurality of engine conditions further comprises at least two from the group including an engine temperature, an engine pressure, an engine torque, an engine rotation speed, and an engine fuel consumption.

12. The method of claim 11, further comprising determining an engine torque factor based on the modified engine power model, wherein determining the engine torque factor comprises extrapolating, by the engine controller, a maximum engine torque available.

13. A system, comprising:
a controller of an aircraft engine, the controller comprising a processor and a memory; and
a plurality of sensors electrically coupled to the aircraft engine, comprising:
(i) a particulate sensor configured to measure at least one of (a) particulate matter in a gas path of the aircraft engine or (b) accumulated particulate matter in the aircraft engine;
(ii) a second sensor configured to detect an operational state of the aircraft engine; and
(iii) a third sensor configured to detect an environmental state of the aircraft engine;
wherein:
the memory is configured to store an aircraft engine power model for simulating an operational state of the aircraft engine as a function of the environmental state of the aircraft engine;
the processor is configured to determine an efficiency of the aircraft engine based on (i) the aircraft engine power model, and (ii) particulate sensor data pertaining to particulate matter in a gas flow, second sensor data of the operational state of the aircraft engine, and third sensor data of the environmental state of the aircraft engine; and
the processor is further configured to extrapolate from the efficiency a maximum power of the aircraft engine under flight conditions.

14. The system of claim 13, wherein:
the memory is initially configured to store a baseline engine power model, and the processor is further configured to modify the baseline engine power model over time based on at least one of (i) a change in engine efficiency over time, or (ii) a comparison of a modeled operational state of the aircraft engine and a sensed operational state of the aircraft engine.

15. The system of claim 14, wherein the processor is further configured to modify the baseline engine power model based on at least one of (i) a modeled effect of particulate matter on overall engine efficiency, or (ii) a modeled effect of particulate matter on a hardware component of the aircraft engine.

16. The system of claim 15, wherein the processor is further configured to:
receive from an engine sensor associated with a component of the aircraft engine at least one of: (i) a first measure of an amount of particulate matter in the component; (ii) a second measure of a performance of the component; or (iii) a third measure of an internal environment of the component; and
determine from at least one of the first measure, the second measure, or the third measure an efficiency of the component.

17. The system of claim 16, wherein the processor is further configured to:
determine a plurality of respective efficiencies of a plurality of respective engine components based on at least one of the first measure, the second measure, or the third measure for each component of the plurality of respective engine components; and
determine an efficiency of the aircraft engine based on a combination of the efficiencies of the plurality of respective engine components.

18. The system of claim 17, wherein the processor is further configured to:
determine a modeled engine efficiency based on a parameterized model of engine function;
determine if a difference between the modeled engine efficiency and a current engine efficiency exceeds a threshold value; and
modify a value of a parameter of the parameterized model of engine function if the difference exceeds the threshold value, wherein the value of the parameter causes the modeled engine efficiency to differ from the current engine efficiency by no more than the threshold value.

19. The system of claim 13, wherein the second sensor is a performance sensor, and the third sensor is a gas path sensor.

20. The system of claim 17, wherein the plurality of respective engine components includes at least one from the group including an engine compressor, an engine combustor, and an engine turbine.

* * * * *

UNITED STATES PATENT AND TRADEMARK OFFICE
CERTIFICATE OF CORRECTION

PATENT NO. : 11,946,421 B2  
APPLICATION NO. : 17/669335  
DATED : April 2, 2024  
INVENTOR(S) : Paul et al.

Page 1 of 1

It is certified that error appears in the above-identified patent and that said Letters Patent is hereby corrected as shown below:

In the Claims

In Column 18, Claim 5, Line 16, delete "of" and insert -- or --, therefor.

Signed and Sealed this  
Twenty-fourth Day of September, 2024

Katherine Kelly Vidal  
*Director of the United States Patent and Trademark Office*